April 11, 1944.  W. D. PROUDFOOT  2,346,605
APPARATUS FOR LOADING AND UNLOADING
Filed Jan. 11, 1943  4 Sheets-Sheet 1

Inventor
William D. Proudfoot

By Clarence A. O'Brien
and Harvey B. Jacobson
Attorneys

April 11, 1944.　　W. D. PROUDFOOT　　2,346,605
APPARATUS FOR LOADING AND UNLOADING
Filed Jan. 11, 1943　　4 Sheets-Sheet 2

Inventor
William D. Proudfoot

By Clarence A. O'Brien
and Harvey B. Jacobson
Attorneys

April 11, 1944. W. D. PROUDFOOT 2,346,605
APPARATUS FOR LOADING AND UNLOADING
Filed Jan. 11, 1943 4 Sheets-Sheet 3
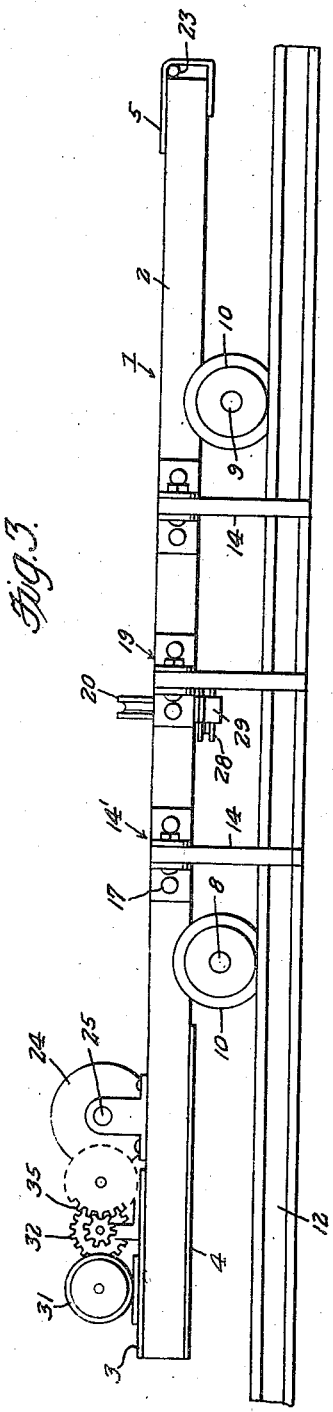
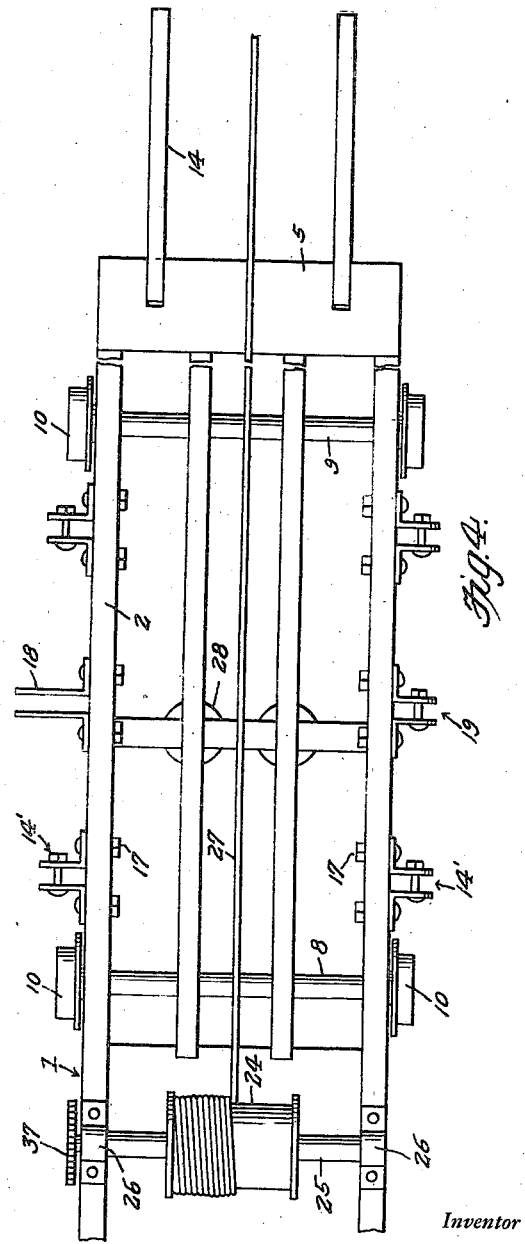
Inventor
William D. Proudfoot
By Clarence A. O'Brien
and Harvey B. Jacobson
Attorneys

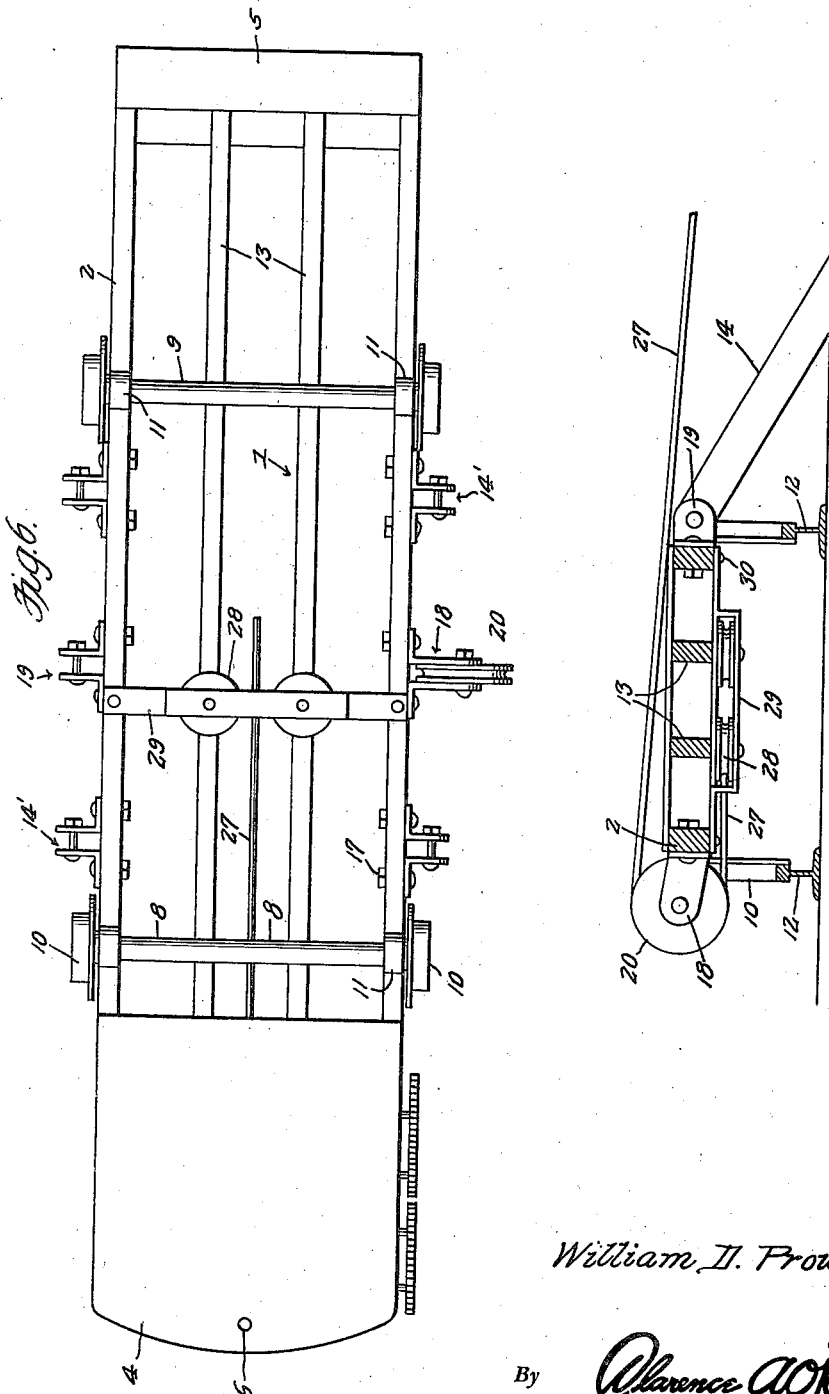

Patented Apr. 11, 1944

2,346,605

UNITED STATES PATENT OFFICE 2,346,605

APPARATUS FOR LOADING AND UNLOADING

William D. Proudfoot, Webster Springs, W. Va., assignor of one-half to Helen Proudfoot, Cowen, W. Va.

Application January 11, 1943, Serial No. 472,045

2 Claims. (Cl. 214—85)

My invention relates to improvements in loading and unloading apparatus for use more particularly, although not necessarily, in coal mines in moving heavy machine units and parts in installation, replacement and relocation operations.

Among the objects of my invention are to provide inexpensive apparatus for quickly loading, unloading, and/or transporting such units with safety to operatives, in confined quarters, and in either high or low coal seams, the apparatus being especially adapted for loading or unloading from either side or one end and for operation with a minimum labor personnel to thereby save labor costs and expedite coal production.

Other and subordinate objects are also comprehended by my invention, all of which, together with the precise nature of my improvements, will be readily understood when the succeeding description and claims are read with reference to the drawings accompanying and forming part of this specification.

Figure 1:
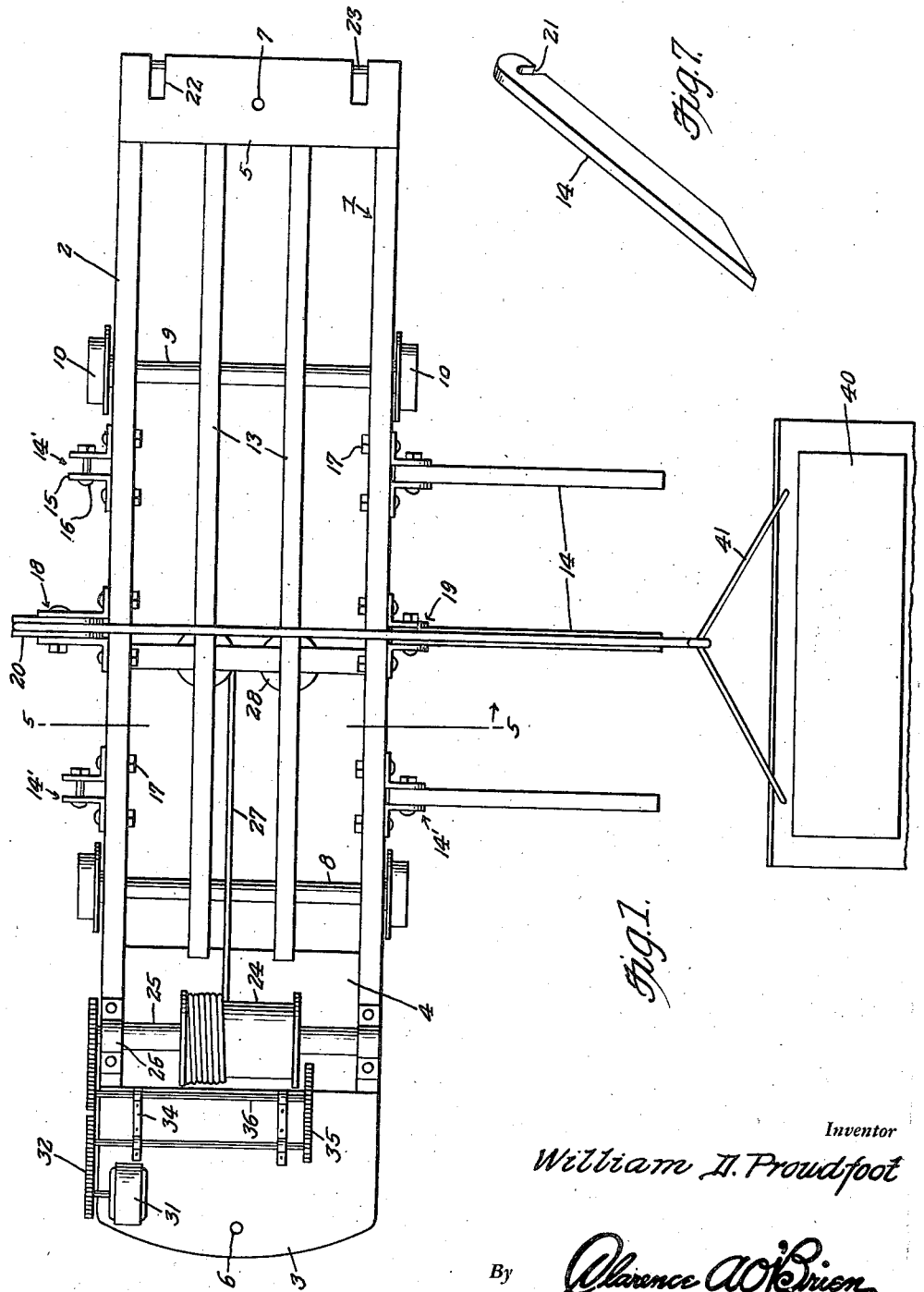
Figure 2:
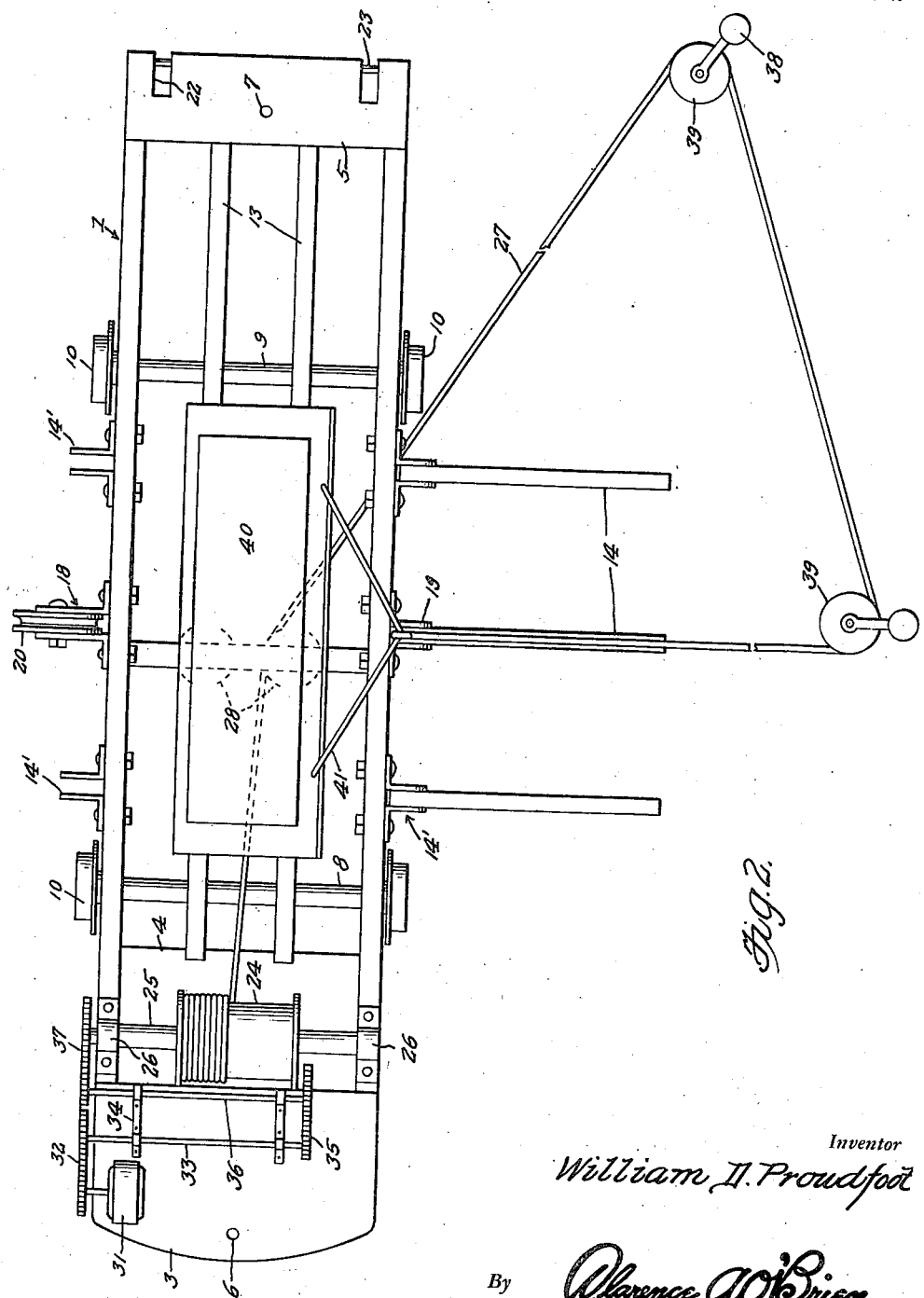

In said drawings:

Figure 1 is a view in top plan of my improved apparatus in its preferred embodiment and illustrating the operation of loading from the right hand side of the apparatus, Figure 2 is a similar view illustrating the operation of unloading to the right hand side of the apparatus, Figure 3 is a view in side elevation, Figure 4 is a view in top plan illustrating the operation of loading from one end, Figure 5 is a view in transverse section taken on the line 5—5 of Figure 1, Figure 6 is a view in bottom plan, and Figure 7 is a view in perspective of one of the slide rails.

Referring to the drawings by numerals, the basic element of my improved apparatus is a wheel supported truck designated generally by the numeral 1 and which is of a low center of gravity and elongated rectangular form. The body of the truck 1 comprises a pair of laterally spaced parallel side beams 2 suitably connected together at what constitutes the front end of the truck by a platform plate 3 overlying the beams 2 and a similar longer guard plate 4 underlying said beams. At the rear end thereof said body is suitably provided with a transversely U-shaped shoe plate 5 connecting the rear ends of the beams 2. The plates 3, 4 and 5 are suitably apertured, as at 6, 7 for receiving the usual coupling pin whereby the truck may be coupled at either end to the usual mine locomotive. A pair of wheel carrying axles 8, 9 extend across the body beneath the same upon opposite sides of the transverse center of said body and which are spaced well inwardly of the ends of the body and provided with usual car wheels 10, the axles extending through suitable bearings 11 and the wheels being spaced apart so as to run on the usual mine car tracks 12. Intermediate the side beams 2 is a pair of load supporting beams 13 extending parallel with said beams 2 upon opposite sides of the longitudinal center of the body from the plate 4 to the plate 5 and which are spaced inwardly from the beams 2 for a purpose presently apparent. The load supporting beams 13 rest at one end on the plate 4 and have their other ends suitably secured in the shoe plate 5.

Means are provided for attaching to either side beam 2 a plurality of slide rails 14, in the present instance three, to incline downwardly laterally from said beams so that a machine unit or the like may be drawn up the same onto the truck or pulled down the rails from off the truck and which comprises the following: Each side beam 2 is provided upon opposite sides of the transverse center thereof with a pair of outstanding keepers 14' having the form of a pair of spaced angle brackets 15 with a bolt extending therebetween, the brackets being permanently bolted, as at 17, to the beam 2. A pair of similar keepers 18, 19 are provided in the transverse centers of the beams, one of which, 18, is utilized as a bearing for a sheave 20 rotatable about an horizontal axis parallel to said beams. The keepers 18, 19 are interchangeable for a purpose presently seen. The slide rails 14 are provided with notched inner ends 21 for hooking over the bolts 17 of the keepers 14' to detachably attach said rails in place.

The before-mentioned rear plate 5 is provided with a pair of notches 21 therein adjacent opposite sides of the body of the truck, and a rod 23 extending across the body of the truck through the plate 5 and notches 22 forms together with said notches a pair of keepers at the rear end of the truck 1 whereby a pair of the slide rails 14' may be hooked onto said end to extend downwardly therefrom to the floor longitudinally of the truck 1 between the tracks 12. Load shifting means are provided which comprise in addition to the sheaves 20 the following devices: At the front end of the truck 1 is a cable winding reel 24 arranged over the plate 4 and fast on a driven shaft 25 extending across the truck with its ends journaled in suitable bearings 26. The cable 27 is adapted to be extended rearwardly from the bottom of the reel 24 between a pair of horizontally disposed sheaves 28 spaced upon opposite sides of the longitudinal center of the truck and suitably mounted in a cage bar 29 extending across said truck 1 below the beams 2, 13 and suitably secured to the beams 2, as at 30, at a point slightly in advance of the transverse center of the truck 1 for a purpose which will be clear.

A suitable motor drive is provided for the reel shaft 25, that shown by way of illustration comprising a motor 31 mounted on the plate 3 and geared, as at 32, to one end of a transverse shaft 33 suitably mounted on the plate 3 and in bearing brackets 34. The other end of the shaft 33 is geared, as at 35, to one end of a second shaft 36 also mounted in the brackets 34 and geared, as at 37, at its other end to one end of the reel shaft 25. As will be understood, the described gearing is designed to provide a reduction gear drive between the motor 31 and the reel shaft 25.

In addition to the foregoing, my invention comprehends a pair of sheave carrying stakes, of any suitable type, and designated 38 adapted to be driven into the floor of the shaft and each suitably provided with a sheave 39.

Referring now to the use and operation of the described invention, and first in loading, for instance, a machine base 40 onto the truck from the right hand side of the same looking toward the rear of the truck, the procedure is as follows: The three slide rails 14 are attached to the appropriate keepers 14′ and 19 on the right hand side, as shown, and the sheave bearing keeper 18 on the left hand side of the truck, as shown. The cable 27 is led laterally from between the sheaves 28 under the sheave 20 and then over the same across the body of the truck and suitably attached, as at 41, to the machine base 40. The motor 31 is then started to operate the reel 24 to wind up the cable so as to pull the base 40 up the slide rails 14 onto the truck so that it rests on the load supporting beams 13.

Considering now unloading the machine base from the right hand side of the truck 1 and with special reference to Figure 2, this operation is accomplished as follows: The stakes 38 are driven into the ground or flooring, not shown, one at a suitable distance from the right hand side of the truck in the approximate transverse center thereof, and the other at a suitable distance to the rear of the first one and on the same side of the truck 1. The cable 27 is led from between the sheaves 28 around the sheave 39 of the rearwardly disposed stake, 38, then forwardly around the sheave 39 of the other stake 38, then upwardly over the right hand side of the truck 1 to the machine base 4 to which it is attached in the same manner as previously described. The slide rails 14 are positioned, as in the case of the loading operation previously described. With the cable 27 thus arranged, the motor 31 may be started to operate the reel 24 to wind up the cable with the result that the machine base 40 will be pulled off the truck 1 down the slide rails 14, as will be clear. In unloading from the left hand side of the truck 1, the sheave bearing keepers 18 and the keeper 19 are interchanged, the slide rails 14 attached to the left hand side of the truck, and the stakes 38 and cable 27 arranged on the left hand side of the truck just as described with reference to unloading from the right hand side of said truck. In loading from the left hand side of the truck 1, the sheave bearing keepers 18 and the keeper 19 are also interchanged, the slide rails attached to the left hand side of the truck, and the cable 27 led from the sheaves 28 under the sheaves 20 and over beyond the left hand side of the truck, as will be understood. When loading from the rear end of the truck, a pair of the slide rails are attached in the keepers 22, as shown in Figure 4. In this operation the cable 27 is led directly over the truck to the object for attachment thereto and winding up to pull the object up the slide rails onto the truck in a manner which will be clear.

Any suitable motor and drive controls may be provided, but since such elements are well known in the art, it has not been deemed necessary to illustrate the same.

The foregoing will, it is believed, suffice to impart a clear understanding of my invention without further explanation.

Manifestly, the invention, as described, is susceptible of modification without departing from the inventive concept, and right is herein reserved to such modifications as fall within the scope of the subjoined claims.

What I claim is:

1. In apparatus of the class described, an elongated wheel supported truck body, a motor driven cable-winding and unwinding reel mounted on one end of said body, a pair of vertical axis sleeves mounted on the bottom of the body and laterally spaced in substantially the transverse center thereof for passage of the cable from the reel therebetween to be trained therefrom to either side of the body, a sheave keeper mounted on one side of said body in the transverse center thereof and having a horizontal axis sheave mounted therein for training of the cable led from said pair under and over the same to be extended across the body, a set of three hooked end rails for attachment to either side of the body to incline laterally downwardly therefrom and for elevating a load pulled up the same by said cable onto said body, a pair of rail keepers upon each side of the body upon opposite sides of the transverse center into which a pair of said rails are adapted to be hooked, and a single similar rail keeper on the side of said body opposite the sheave keeper into which the third rail is adapted to be hooked, said last-mentioned keeper and the sheave keeper being interchangeable.

2. In apparatus of the class described, an elongated wheel supported truck body, comprising a pair of parallel side beams, a platform plate overlying said beams at one end of the body, a longer guard plate underlying said beams at said end of the body and extending inwardly beyond said first plate, a transversely U-shaped plate fastened over the ends of the beams at the opposite end of said body, a pair of load supporting beams extending from the inner edge of said guard plate into said U-shaped plate parallel with and spaced from the side beams upon opposite sides of the longitudinal center of the body, a reel shaft extending across said body over said guard plate adjacent the first-mentioned plate, a cable winding reel on said shaft, and a motor drive for said shaft including a motor and transmission gearing on said first plate.

WILLIAM D. PROUDFOOT.